(12) United States Patent  
Smith et al.

(10) Patent No.: US 8,434,289 B2
(45) Date of Patent: May 7, 2013

(54) SENSOR FOR DETECTION OF WRAPPING ON BALE

(75) Inventors: Kevin M. Smith, Narvon, PA (US); Christopher A. Foster, Denver, PA (US); John Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 276 days.

(21) Appl. No.: 12/464,322

(22) Filed: May 12, 2009

(65) Prior Publication Data

US 2010/0288140 A1    Nov. 18, 2010

(51) Int. Cl.
B65B 57/02    (2006.01)

(52) U.S. Cl.
USPC ............. 53/505; 53/118; 53/430; 53/506

(58) Field of Classification Search ............ 53/116–118, 53/430, 438, 505, 506, 528, 529
See application file for complete search history.

(56) References Cited

U.S. PATENT DOCUMENTS

| 5,419,253 | A | * | 5/1995 | Campbell ......................... 100/3 |
|---|---|---|---|---|
| 5,551,218 | A |  | 9/1996 | Henderson et al. |
| 5,581,976 | A | * | 12/1996 | Underhill ........................ 53/399 |
| 5,615,544 | A |  | 4/1997 | Berger et al. |
| 5,687,548 | A | * | 11/1997 | McClure et al. ................ 53/399 |
| H1819 | H |  | 12/1999 | Anderson et al. |
| 6,012,271 | A |  | 1/2000 | Wilkens et al. |
| 6,021,622 | A |  | 2/2000 | Underhill |
| 6,029,420 | A | * | 2/2000 | Tertilt et al. ..................... 53/118 |
| 6,073,433 | A | * | 6/2000 | Roth ................................ 56/341 |
| 6,209,450 | B1 | * | 4/2001 | Naaktgeboren et al. .......... 100/4 |
| 6,463,714 | B2 | * | 10/2002 | Viaud ............................. 53/118 |
| 6,467,237 | B2 | * | 10/2002 | Viaud ............................. 53/118 |
| 6,550,218 | B2 | * | 4/2003 | McClure et al. ................ 53/118 |
| 6,594,975 | B2 | * | 7/2003 | Anstey et al. .................... 53/556 |
| 6,598,369 | B2 | * | 7/2003 | Anstey et al. .................... 53/118 |
| 6,619,011 | B2 | * | 9/2003 | Anstey et al. .................... 53/118 |
| 6,622,454 | B2 | * | 9/2003 | Anstey ............................ 53/118 |
| 6,622,463 | B1 | * | 9/2003 | Anstey et al. .................... 53/587 |
| 6,631,604 | B2 | * | 10/2003 | Anstey ............................ 53/118 |
| 6,774,805 | B1 | * | 8/2004 | Viesselmann et al. ......... 340/675 |
| 6,796,109 | B2 | * | 9/2004 | Viaud ............................. 53/587 |
| 6,886,307 | B2 | * | 5/2005 | Viaud et al. .................... 53/118 |
| 6,928,796 | B2 | * | 8/2005 | Viaud ............................. 53/587 |
| 6,966,162 | B2 | * | 11/2005 | Viaud et al. ...................... 53/64 |
| 7,065,942 | B2 | * | 6/2006 | Viaud ............................. 53/587 |
| 7,222,566 | B2 |  | 5/2007 | Biziorek |

(Continued)

FOREIGN PATENT DOCUMENTS

| DE | 10011158 A1 | 9/2001 |
|---|---|---|
| DE | 10204941 A1 | 8/2003 |
| WO | 9841450 | 9/1998 |
| WO | WO 9841450 A1 * | 9/1998 |

*Primary Examiner* — M. Alexandra Elve
*Assistant Examiner* — Eyamindae Jallow
(74) *Attorney, Agent, or Firm* — Patrick M. Sheldrake

(57) ABSTRACT

A baling machine and method for forming a bale is disclosed. A sensor is positioned in the bailing chamber and is positioned to sense an area proximate the perimeter of the bale to determine if material is present, thereby determining if the bale is properly wrapped or not. When the bale is not properly wrapped, material is present in the area proximate the perimeter in which the sensor is active; causing the sensor to send a signal indicating that the bale is not properly wrapped.

20 Claims, 4 Drawing Sheets

U.S. PATENT DOCUMENTS

| | | | |
|---|---|---|---|
| 7,278,251 B2* | 10/2007 | Paillet et al. | 53/508 |
| 7,430,959 B2* | 10/2008 | Routledge | 100/87 |
| 7,437,866 B2 | 10/2008 | Smith et al. | |
| 7,647,752 B2* | 1/2010 | Magnell | 53/504 |
| 8,046,973 B2* | 11/2011 | Petrolati | 53/118 |
| 2002/0189199 A1* | 12/2002 | Anstey et al. | 53/118 |
| 2003/0005663 A1* | 1/2003 | Anstey et al. | 53/118 |
| 2003/0115841 A1* | 6/2003 | Davis et al. | 53/587 |
| 2003/0230046 A1* | 12/2003 | Viaud et al. | 53/118 |
| 2004/0182043 A1* | 9/2004 | Viaud et al. | 53/67 |

\* cited by examiner

SENSOR FOR DETECTION OF WRAPPING ON BALE

FIELD OF THE INVENTION

The present invention is directed to a device for creating and wrapping a bale, and in particular to a sensor for detecting if the bale is properly wrapped.

BACKGROUND OF THE INVENTION

Wrapping a bale after it has been formed must be done to prevent the degradation of the crops rolled in the bale. For this reason, it is important to provide wrapping which extends about the entire circumference of the bale. It is also important to insure that the integrity of the wrapped bale is maintained over the entire circumference of the bale. Improperly wrapped bales, or bales with damaged wrapping or netting, result in damaged or rotting crops.

DE-A1-100 11 158 discloses a baler with a device for wrapping a bale with a wrapping sheet. The wrapping sheet is pulled off a supply reel by means of an advancing roller. The device has a sensor system which detects incorrect feeding of the wrapping sheet. The sensor system may be an optical sensor which detects the difference in light density between an area where the wrapping sheet is present and where it is not. If the sensor system detects a malfunction, the wrapping process is suspended. This sensor system merely detects whether the wrapping sheet has been properly deployed. It does not sense whether the wrapping sheet is damaged or whether the bale is properly wrapped.

U.S. Pat. No. 6,966,162 discloses a device for wrapping a bale with a wrapping sheet. The device has one or more sensors that detect whether the wrapping sheet has been properly deployed on the bale. A baling press is equipped with a wrapping device as well as a control or regulating unit that receives a signal from one or more sensors and acts to interrupt the wrapping of a bale in the event the signal indicates that the wrapping sheet has not properly advanced. The sensors can be optical sensors, mechanical sensors, distance sensors, infrared sensors or any other suitable type of sensor. These sensors may respond to changes in color or contrast. The sensors merely detect whether the wrapping sheet has been properly deployed. The sensors do not sense whether the wrapping sheet is damaged or whether the bale is properly wrapped.

In both of these prior art devices, if the wrapping sheet is not properly dispensed or if the wrapping sheet becomes jammed, the sensors are helpful to determine that a malfunction has occurred. In response, the wrapping process is suspended and an appropriate signal is sent. However, these sensors do not facilitate an understanding of whether the wrapping sheet or netting has been damaged or whether the bale was properly wrapped. It would, therefore, be beneficial to incorporate a sensor which could be easily incorporated into existing designs of balers and which would provide a signal if the bale was not properly wrapped.

SUMMARY OF THE INVENTION

One aspect of the invention is directed to a baling machine for forming a bale. The baling machine has a baling chamber in which the bale is formed. Rollers are positioned in the baling chamber and are movable to an extended position. The bailing machine also has a device for wrapping the bale with a wrapping sheet when the rollers are in the extended position. A sensor is positioned in the bailing chamber and is positioned to sense an area proximate the perimeter of the bale to determine if material is present, thereby determining whether the bale is properly wrapped. When the bale is not properly wrapped, material is present in the area proximate the perimeter in which the sensor is active, causing the sensor to send a signal indicating that the bale is not properly wrapped.

Another aspect of the invention is directed to a baling machine for forming a cylindrical bale. The baling machine has a baling chamber in which the cylindrical bale is formed. Rollers are positioned in the baling chamber and are movable to an extended position. The baling machine also has a device for wrapping the cylindrical bale with a wrapping sheet when the rollers are in the extended position. A sensor is positioned in the baling chamber so as to sense an area proximate the circumference of the cylindrical bale to determine if material is present, thereby determining whether the cylindrical bale is properly wrapped. When the cylindrical bale is not properly wrapped, material is present in the area proximate the circumference in which the sensor is active, causing the sensor to send a signal indicating that the cylindrical bale is not properly wrapped.

Another aspect of the invention is directed to a method of forming a bale, the method comprising the steps of: rolling the material to be baled; wrapping the bale; detecting if material is present in an area of the bale proximate the circumference of the bale; and sending a signal that the bale is not properly wrapped if material is detected in the area of the bale proximate the circumference of the bale.

By sensing the area about the perimeter of the bale, the sensor does not monitor the wrapping or netting directly; rather, the sensor monitors the area proximate the circumference of the bale to determine if loose material is present. If the wrapping or netting is not properly dispensed, the loose material will continue to block a signal sent by an emitter of the sensor toward a detector of the sensor, indicating improper wrapping. In addition, if the wrapping or netting is punctured, torn, loose or not evenly distributed, the sensor will sense that loose material is still present in the area proximate the perimeter of the bale, as loose material will continue to intermittently block the signal sent by the emitter toward the detector, thereby indicating improper wrapping.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
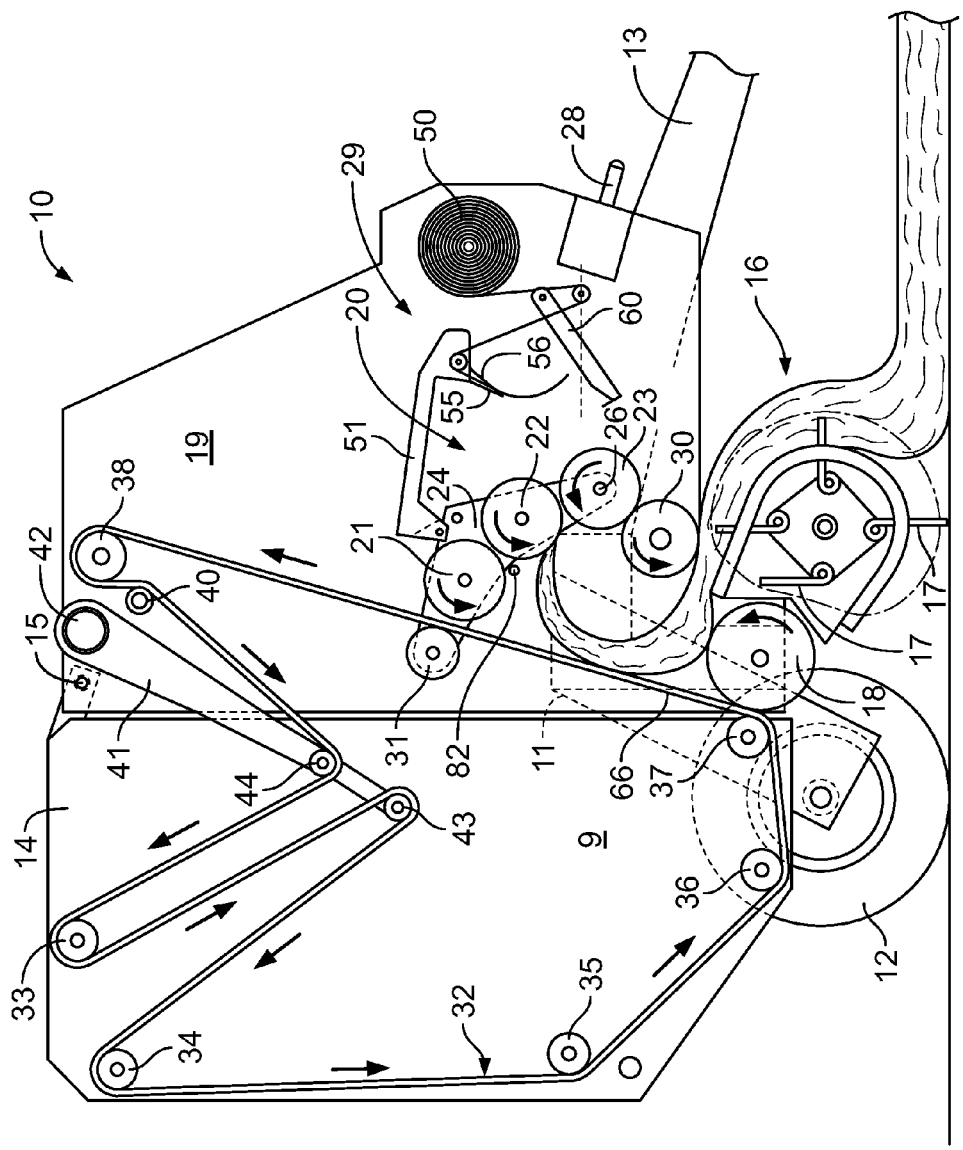
FIG. 1 is a side elevational view of a round baler having a sensor located proximate bale-forming rollers.

FIG. 1 shows a rotary or round baler 10 having an expandable chamber defined in part by belts and rollers, as disclosed in U.S. Pat. No. 4,870,812, issued Oct. 12, 1989, in the name of Richard E. Jennings, et al. Baler 10 has a main frame 11, including a pair of side walls 19 (only one side wall is shown), supported by a pair of wheels 12 (only one wheel 12 shown). As used herein, a rotary or round baler 10 is a baler that produces a substantially cylindrical bale having a substantially round or circular cross section. A forwardly mounted tongue 13 is provided on main frame 11 for connection to a tractor (not shown). Pivotally connected to a side wall 19 by a pair of stub shafts 15 is a tailgate 14 which is closed during bale formation. A pickup 16, mounted on main frame 11, includes tines 17 movable in a predetermined path to lift crop material from the ground and deliver it to a floor roller 18, rotatably mounted on main frame 11.

An expandable chamber 9 for forming bales is defined partly by a sledge assembly 20 comprising transversely extending bale-forming rollers 21, 22, 23 journalled at their ends in a pair of spaced arms 24, one of which is shown. These arms 24 are pivotally mounted on stub shafts 26 for providing movement of sledge assembly 20 from the bale-starting position shown in FIG. 1 through the partly full position shown in FIG. 2 to the full bale position shown in FIG. 3. Rollers 21, 22, 23 are driven in a counter-clockwise direction by conventional means (for example, chains and sprockets) coupled to a drive shaft 28. A starter roller 30, mounted on main frame 11, is also driven counter-clockwise. A freely rotatable idler roller 31, carried by arms 24, moves in an arcuate path with sledge assembly 20.

Figure 2:
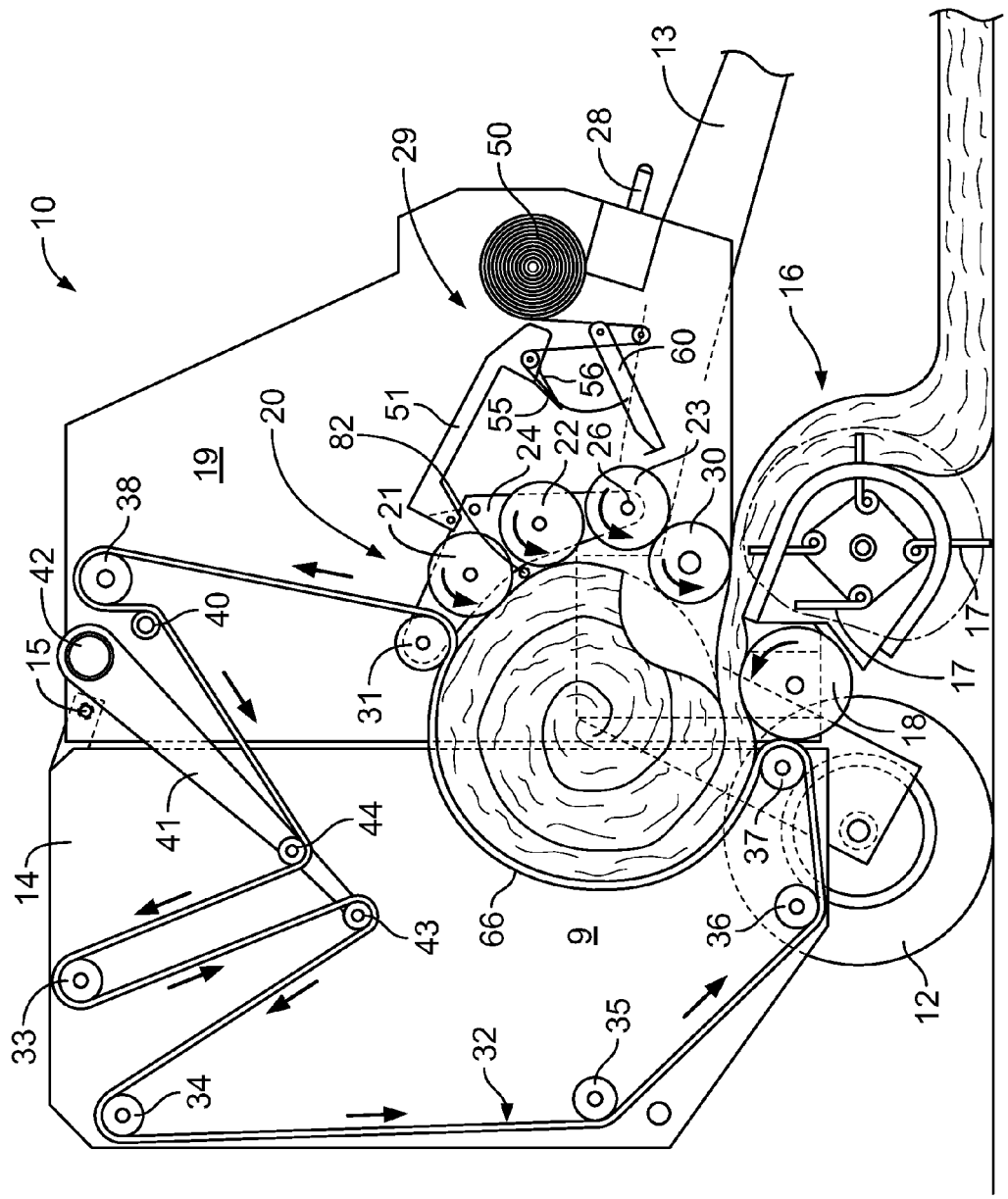
FIG. 2 is a side elevational view similar to FIG. 1 with the bale-forming chamber of the baler in a partly full position.
Figure 3:
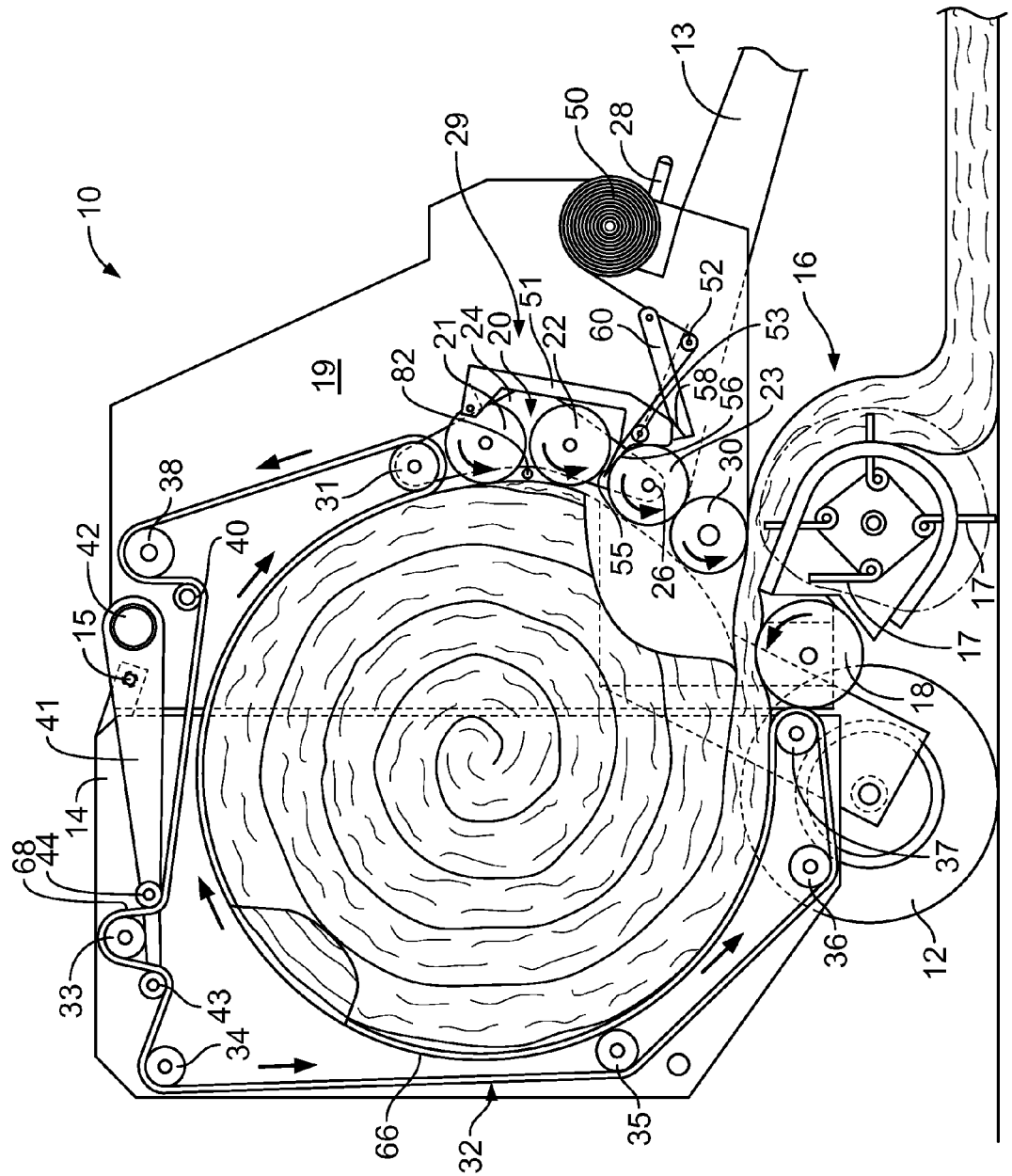
FIG. 3 is a side elevational view similar to FIG. 1 with the bale-forming chamber of the baler in a full bale position forming an unwrapped bale.

Net wrapping apparatus 29, as shown in FIGS. 1-3, is mounted between side walls 19 on main frame 11 and sledge assembly 20 forwardly of the bale forming chamber. Net is dispensed from a supply or net roll 50 to the chamber via an opening between rolls 22 and 23 in a manner described in detail below. Similar mechanisms for dispensing wrapping material are shown in U.S. Pat. Nos. 4,956,968 and 5,289,672, mentioned above.

The bale-forming chamber 9 is further defined by an apron 32 comprising a plurality of continuous side-by-side belts supported by guide rollers 33, 34, 35, 36, 37 rotatably mounted in tailgate 14. Apron 32 is also supported by drive roller 38, mounted on main frame 11. Although apron 32 passes between roller 21 and idler roller 31, it is in engagement only with idler roller 31 and not roller 21. Suitable coupling means (not shown) connected to drive shaft 28 provide rotation of drive roller 38, causing movement of apron 32 in the directions indicated by the arrows in FIGS. 1, 2 and 3. An additional guide roller 40 in the main frame 11 ensures proper engagement between apron 32 and drive roller 38. A pair of take-up arms 41 (only one shown) is pivotally mounted on main frame 11 by a cross shaft 42 for movement between inner, intermediate and outer positions shown in FIGS. 1, 2 and 3, respectively. Take-up arms 41, which carry additional guide rollers 43, 44 for supporting apron 32, are resiliently urged toward their inner positions (FIG. 1).

When the elements of round baler 10 are disposed as shown in FIG. 1, an inner course 66 of apron 32 extends between guide roller 37 and idler roller 31 to form the rear wall of the core starting chamber 9, while the inwardly facing surfaces of rollers 21, 22, 23 define, in a general manner, a rearwardly inclined front wall. Floor roller 18 defines the bottom of the chamber, and with starter roller 30, provides an inlet for crop material.

When round baler 10 travels across a field, pickup tines 17 lift crop material from the ground and deliver it through the inlet. The crop material is conveyed by floor roller 18 into engagement with apron inner course 66 (FIG. 1) which urges the crop material upward and forward into engagement with the rollers on sledge assembly 20. In this manner, crop material is coiled in a clockwise direction to start a bale core. Continued feeding of crop material into the chamber by pickup tines 17 causes apron inner course 66 to expand in length around a portion of the circumference of the bale core as the diameter increases (FIG. 2). Take-up arms 41 rotate from their inner position, shown in FIG. 1, toward their outer position, shown in FIG. 3, to accommodate expansion of the inner course 66 of the apron in a well known manner, i.e., an outer course 68 of apron 32 is diminished in length while the inner course 66 increases a like amount. After a bale has been formed and wrapped, tailgate 14 is opened and the bale is ejected rearwardly. Subsequent closing of tailgate 14 returns the inner and outer courses 66, 68 of apron 32 to the locations shown in FIG. 1.

During bale formation, sledge assembly 20 moves between a bale-starting position (FIG. 1) to a full bale position (FIG. 3). This movement causes idler roller 31 to move in an arcuate path while maintaining apron 32 in close proximity to roller 21, thereby allowing roller 21 to strip crop material from the belts and prevent or reduce significantly the loss of crop material between roller 21 and apron 32 during bale formation. Sledge assembly 20 is pushed outward towards its full bale position during bale formation as the crop material expands against rollers 21, 22, 23 and then subsequently is pulled inward by apron 32 to the position shown in FIG. 1.

Wrapping apparatus 29 more particularly comprises net insertion assembly 51 shown, firstly, in its inactive condition in FIG. 1, under conditions where a bale core is being initiated in the chamber; secondly, while still in its inactive condition in FIG. 2, in the position it takes after the cylindrical package of crop material has reached the full chamber condition; and, lastly, net insertion assembly 51 is shown in the dispensing condition in FIG. 3. More particularly, FIG. 3 shows active net roll 50 operatively mounted for dispensing net, via wrapping apparatus 29, along path p, i.e., around guide roll 52 to spreader roll 53. The net is finally severed by a shear bar and knife 58, mounted on arm 60, in a manner known in the art—e.g., severing systems of this type are shown in U.S. Pat. Nos. '672 and '968, referred to above. An insertion assembly of this type is shown in U.S. Pat. No. 6,021,622, issued Feb. 8, 2000, in the name of Kenneth R. Underhill, referred to above and hereby incorporated by reference. A twine arm assembly, shown in U.S. Pat. No. 5,581,973, issued Dec. 10, 1996, in the name of Kenneth R. Underhill, is also adaptable for use with net insertion assembly 51. In the '973 patent, both twine and net wrapping systems are contemplated on the same baler, which is a fixed-diameter chamber baler employing rolls in combination with chains and slats to define the chamber. Likewise, even though net wrapping is illustrated for the purposes of this description, the insertion of twine or plastic webbing into the bale-forming chamber is also contemplated. To this end, reference is again made to U.S. Pat. No. 5,581,973, assigned to a common assignee. The '973 patent, hereby incorporated by reference, shows apparatus for wrapping with net and/or twine, albeit, the baler is a fixed-chamber type machine.

The wrapping apparatus of baler 10 is merely illustrative of one of the many types to which the features of the present invention are adaptable. For example, although a net wrapping system is shown, utilization of plastic wrap or twine would have no effect on the general aspects of the present invention. To further enhance understanding of the various features of the present invention, it should be noted that even though a unified sledge and take-up assembly is shown, the invention is equally adaptable to other types of round baler configurations having wrapping apparatus operative in the vicinity of a pair of transverse rolls defining a slot through which a wrapping medium is introduced, e.g., a variable-diameter round baler in which the take-up arms and sledge are not integral, a round baler having a chamber with a fixed diameter, etc. Thus, the many advantages realized by the present invention are not limited to a round baler with a particular fixed or variable chamber configuration.

As shown in FIGS. 1-5, sensor 82 is provided in the baling chamber 9 in areas adjacent the rollers 21, 22. The sensor 82 has an emitter 84 mounted on one arm 24 and a detector 86 mounted on the other arm. The sensor 82 could be provided downstream from the net wrapping apparatus 29, in the area below (in clockwise direction) where the wrapping material is fed, i.e., between rollers 23, 30. However, in the preferred embodiment, the sensor, as shown in FIGS. 1-3, is positioned upstream from the net wrapping apparatus 29, i.e., between rollers 21, 22. This position allows the sensor 82 to detect if the netting has made a complete revolution around the bale 8.

Figure 6:
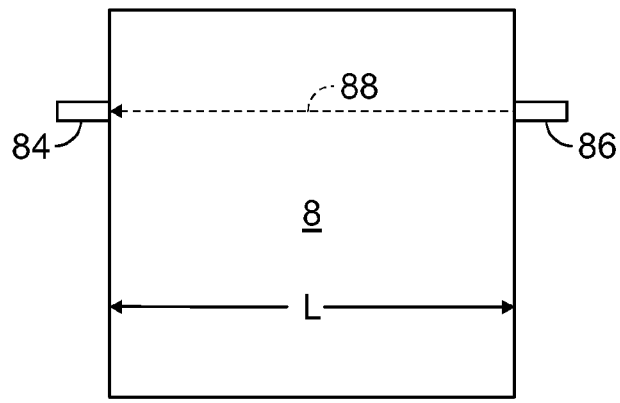
FIG. 6 is a diagrammatic view of the bale and the sensor, showing the emitter and detector of the sensor positioned at either end of the bale.

As best shown in FIG. 6, the emitter 84 is positioned on a respective arm 24 proximate one side wall 19, and the detector 86 is positioned on the other respective arm 24 proximate the other side wall. As depicted in FIG. 6, the spacing of the emitter 84 and detector 86 allows the sensor 82 to sense the entire length L of bale 8, i.e., along the outer perimeter surface of the bale. The sensor 82 can be, for example, an optic sensor, a photoelectric sensor, an ultrasonic sensor, an infrared sensor, or any other suitable type of sensor. As an alternative, the emitter and the detector may be positioned proximate the same side wall. In this embodiment the emitter and the detector may be housed in the same housing or in separate housings. A reflective surface is provided proximate the other side wall, allowing the signal sent by the emitter to bounce back or reflect off of the reflective surface toward the detector.

The sensor 82 is connected to a control or regulating device (not shown) which can be positioned in various locations, including the operating compartment of the vehicle which pulls the baler 10. The control or regulating device may have a visual or audible alarm to alert the operator if the bale 8 has not been properly wrapped, as will be more fully described.

The bale 8 is formed in the baling chamber 9 as previously described, or in any other manner practiced in the art. When the cylindrical package of crop material or bale 8 reaches the full chamber condition, the wrapping apparatus 29 is engaged, causing the net insertion assembly 51 to dispense the net from the net roll 50.

In the embodiment shown, the sensor 82 is activated after the bale 8 reaches the full chamber position and after the wrapping apparatus 29 has been engaged. In the alternative, the sensor 82 may be activated prior to the engagement of the wrapping apparatus 29 or simultaneous therewith.

In the embodiment shown, the emitter 84 sends a beam of light 88 toward the detector 86 when the sensor 82 is activated. However, other types of signals may be generated by the emitter 84 depending on the type of sensor used, e.g., infrared beam for an infrared sensor.

Figure 4:
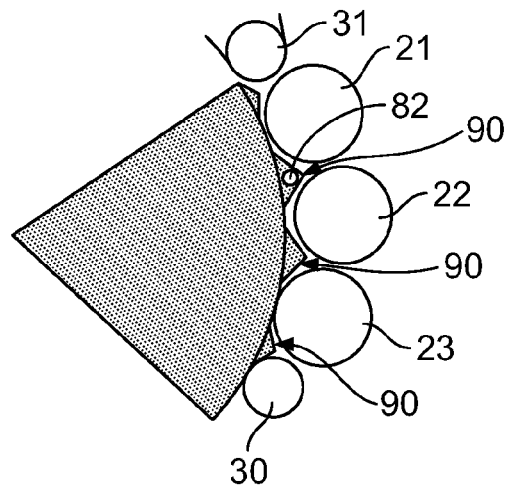
FIG. 4 is an enlarged side view of the bale-forming rollers, sensor and bale, the bale having loose material present between the bale-forming rollers and the sensor.

Referring to FIG. 4, when the bale 8 is not properly wrapped, loose crop material 90 is present between the rollers, including between the rollers 21, 22 where the sensor 82 is positioned. With the loose crop material present between the rollers 21, 22, no light—or only small amounts of light—generated by the emitter 84 reaches or registers with the detector 86. When this interruption of light occurs, the sensor 82 sends a signal to the control device which indicates that the bale 8 is not properly wrapped.

Alternatively, if no loose crop material is present between the rollers, as shown in FIG. 6, all of the light, or the majority of light, generated by the emitter 84 reaches the detector 86. When this interruption of light occurs, the sensor 82 sends a signal to the control device which indicates that the bale 8 is properly wrapped.

The amount of light generated by the emitter 84 which must reach the detector 86 before the bale is considered properly wrapped can be varied and programmed according to the density of the crop, the moisture in the ground, dust in the air or any other relevant variables which may affect the amount of light that reaches the detector 86 from the emitter 84. Alternatively, the light received by the detector 86 after wrapping is compared to the light received by the detector 86 prior to wrapping. For a successful wrap, the light received by the detector 86 is greater after wrapping.

Figure 5:
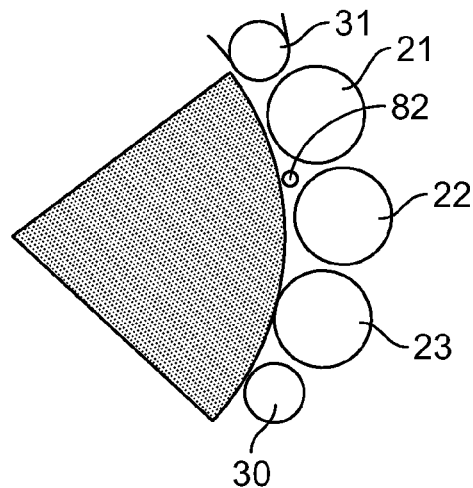
FIG. 5 is an enlarged, partial side view of the bale-forming rollers, sensor and bale, the bale being properly wrapped with no loose material present between the bale-forming rollers and the sensor.

In operation of the embodiment described, the wrapping apparatus 29 dispenses the netting when the bale-forming chamber 9 of the baler 10 reaches full chamber, forming the bale 8. As this occurs, the net is seized and conveyed by the bale 8, causing the bale 8 to become wrapped with the netting through its own rotation. The sensor 82 is activated when the netting is scheduled to reach the location of the sensor 82. This location is calculated by measuring the circumference of the bale 8 and the speed of rotation of the bale 8. The activated sensor 82, which monitors the area proximate the bale 8 (as shown in FIGS. 4 and 5), continues to send signals from the emitter 84 to the detector 86. When the detector 86 registers an amount of light which equals or exceeds the programmed amount of light required for a properly wrapped bale (as previously discussed) for a programmed period of time, the sensor 82 sends a signal that the bale 8 is properly wrapped. This signal causes the wrapping operation to be terminated and the properly wrapped bale 8 to be discarded from the bale chamber 9 in the manner previously described. If additional crop is to be baled, the entire baling operation is then repeated. The programmed period of time is determined by calculating the time required for the bale 8 to make one complete rotation in the bale-forming chamber 9.

Alternatively, the wrapping apparatus may be programmed to dispense a set number of wraps to the bale 8. This could be determined by the operator based on the bale diameter and other conditions.

During this programmed period of time or programmed wrap dispensing, if the detector 86 does not register sufficient light, the sensor 82 sends a signal that the bale 8 is not properly wrapped, indicating to the operator that the bale 8 and baler 10 must be examined. If the detector 86 registers insufficient light during any time during the programmed period of time, the signal indicative that the bale 8 is not properly wrapped will be sent. Consequently, the sensor 82 will send a message that the bale 8 is not properly wrapped not only if the netting has not been properly dispensed, but also if the netting has been properly dispensed but a hole has developed in the netting during the wrapping process. As the sensor 82 continues to be active for at least one full rotation of the bale 8 in the bale chamber 9, the sensor 82 does monitor the entire circumference of the bale 8, not just particular points.

In the alternative, if the detector 86 registers insufficient light, the baler 10 may be programmed to continue the wrapping process for one or more rotations in order to try to cure any defects in the rolling operation.

The sensor 82 does not monitor the netting that is being dispensed; the sensor 82 is monitoring an area proximate the perimeter circumference of the bale 8 to determine whether the bale 8 is properly wrapped. Previous sensors have monitored the netting or wrapping sheet to determine if an appropriate amount of the netting or wrapping sheet had been properly dispensed to cover the circumference of the bale 8. These prior art sensors merely measure points to determine if the netting has been dispensed to that particular point. If previous sensors sensed that netting was present, a positive signal would be sent that the netting had properly deployed and the bale had been properly wrapped. However, if the netting was torn, punctured, loose or not evenly distributed over the length L of the bale, previous sensors would not register these problems. This situation could cause severe hardship, since torn, punctured, loose or unevenly distributed netting can allow moisture to penetrate the bale, causing the bale to rot. The prior art sensors, therefore, have limited usefulness.

In contrast, sensor 82 detects the entire length L of the bale 8 around the entire circumference of the bale. In addition, sensor 82 does not monitor the netting directly; rather, the sensor 82 monitors the area proximate the circumference of the bale 8 to determine if loose material is present. If the netting is not properly dispensed, the loose material will continue to block the light sent by the emitter 84 toward the detector 86, indicating improper wrapping. In addition, if the netting is punctured, torn, loose, not evenly distributed or has other defects, the sensor 82 will sense that loose material is still present in some or all of the areas proximate the circumference of the bale 8, as loose material will continue to intermittently block the light sent by the emitter 84 toward the detector 86, thereby indicating improper wrapping and sending an appropriate signal to the operator. With this knowledge, the operator can rewrap the bale or take other remedial steps to prevent damage to the bale 8.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A baling machine for forming a bale, the baling machine comprising:
   a baling chamber in which the bale is formed;
   rollers positioned in the baling chamber, the rollers being movable to an extended position;
   a device for wrapping the bale with a wrapping sheet;
   a sensor positioned in the baling chamber, the sensor positioned to sense an area between a first and second one of the rollers to determine if material is present between the rollers, wherein an outer bale contacting point on at least one roller is closer to a center of the baling chamber than the sensed area;
   the sensor configured when active to send a signal indicating that the bale is not properly wrapped when material is detected in area
   wherein the sensor includes an emitter positioned proximate a side wall of the baling chamber a detector, whereby the sensor senses the area proximate the perimeter of the bale along its entire length.

2. The baling machine as recited in claim 1 wherein the sensor is positioned proximate a respective bale forming roller.

3. The baling machine as recited in claim 1 wherein the detector is positioned proximate an opposing second side wall of the baling chamber, whereby the sensor senses the area proximate the perimeter of the bale along its entire length.

4. The baling machine as recited in claim 3 wherein the sensor is an optic sensor, with the emitter sending a beam of light toward the detector, whereby when the bale is not properly wrapped, material is present in the area proximate the perimeter, preventing the detector from registering sufficient light from the emitter, causing the sensor to send a signal indicating that the bale is not properly wrapped.

5. The baling machine as recited in claim 3 wherein the sensor is an optic sensor, with the emitter sending a beam of light toward the detector, whereby when the bale is properly wrapped, material is not present in the area proximate the perimeter, allowing the detector to register sufficient light from the emitter, causing the sensor to send a signal indicating that the bale is properly wrapped.

6. The baling machine as recited in claim 1 wherein the sensor is active for at least one full rotation of the bale in the bale chamber, thereby allowing the sensor to monitor the entire perimeter of the bale to determined if any defects are present which allows material to be present in the area proximate the perimeter.

7. A baling machine for forming a cylindrical bale, the baling machine comprising:
   a baling chamber in which the cylindrical bale is formed;
   rollers positioned in the baling chamber;
   a device for wrapping the cylindrical;
   a sensor positioned proximate a roller, the sensor positioned to sense an area proximate the circumference of the cylindrical bale to determine if material is present and wherein a point on the surface of the roller is closer to a center of the baling chamber than the sensed area and the sensor includes an emitter positioned proximate a first side wall of the baling chamber and a detector, whereby the sensor is positioned to sense the area proximate the perimeter of the bale along its entire length;
   whereby when the cylindrical bale is not properly wrapped, material is sensed by the senor present in the area proximate the circumference in which the sensor is active, causing the sensor to send a signal indicating that the cylindrical bale is not properly wrapped.

8. The baling machine as recited in claim 7 wherein the sensor being positioned proximate a respective bale forming roller.

9. The baling machine as recited in claim 8 wherein the sensor is positioned between bale forming rollers and configured to detect if material is improperly present within the sensed area which is in a lateral gap between the two bale forming rollers.

10. The baling machine as recited in claim 7 wherein the detector is positioned proximate an opposing second side wall of the baling chamber, whereby the sensor senses the area proximate the circumference of the cylindrical bale along its entire length.

11. The baling machine as recited in claim 10 wherein the sensor is an optic sensor, with the emitter sending a beam of light toward the detector, whereby when the cylindrical bale is not properly wrapped, material is present in the area proximate the circumference, preventing the detector from registering sufficient light from the emitter, causing the sensor to send a signal indicating that the cylindrical bale is not properly wrapped.

12. The baling machine as recited in claim 10 wherein the sensor is an optic sensor, with the emitter sending a beam of light toward the detector, whereby when the cylindrical bale is properly wrapped, material is not present in the area proximate the circumference, allowing the detector to register sufficient light from the emitter, causing the sensor to send a signal indicating that the cylindrical bale is properly wrapped.

13. The baling machine as recited in claim 7 wherein the sensor is active for at least one full rotation of the cylindrical bale in the bale chamber, thereby allowing the sensor to monitor the entire circumference of the bale to determined if any defects are present which allows material to be present in the area proximate the circumference.

14. A method of forming a bale comprising the steps of:
   rolling the material to be baled;
   wrapping the bale;
   detecting if material is present in an area of the bale chamber proximate the circumference of the bale beyond a boundary radially offset from an outer surface of the bale with respect to a center of the bale and further from the outer surface of the bale than a tangent line between bale contacting points of two bale forming members wherein material is not found during a wrapping cycle having no faults; and
   sending a signal that the bale is not properly wrapped if material is detected as gathering beyond the boundary in the sensed area.

15. The method of forming a bale as recited in claim 14, comprising the additional step of:
   sending a signal that the bale is properly wrapped if material is not detected in the area of the bale proximate the circumference of the bale.

16. The method of forming a bale as recited in claim 14, comprising the additional step of:
   sending a signal from an emitting portion of a sensor for detecting if the material is present toward a detecting portion of the sensor.

17. The method of forming a bale as recited in claim 14, comprising the additional step of:
   detecting a signal sent from an emitting portion of a sensor for detecting if the material is present toward a detecting portion of the sensor.

18. The method of forming a bale as recited in claim 14, comprising the additional step of:
   continuing to wrap the bale in response to the signal that the bale is not properly wrapped.

19. The method of forming a bale as recited in claim 14, comprising the additional step of:
   stopping the process of wrapping the bale in response to the signal that the bale is not properly wrapped.

20. The method of forming a bale as recited in claim 14, comprising the additional step of:
   positioning a sensor for detecting if the material is present proximate the at least one bale forming member, wherein the bale forming member includes rollers.

\* \* \* \* \*